(12) United States Patent  
Jones (10) Patent No.: US 7,364,348 B1  
(45) Date of Patent: Apr. 29, 2008

(54) DRINKING VESSEL WITH MIXER

(75) Inventor: David A. Jones, Indianapolis, IN (US)

(73) Assignee: Jon Rich Corporation, Indianapolis, IN (US)

( * ) Notice: Subject to any disclaimer, the term of this patent is extended or adjusted under 35 U.S.C. 154(b) by 0 days.

(21) Appl. No.: 11/726,489

(22) Filed: Mar. 22, 2007

(51) Int. Cl.
*A47J 43/046* (2006.01)

(52) U.S. Cl. ............... 366/130; 366/205; 366/314
(58) Field of Classification Search .......... 366/130, 366/237–238, 243, 276–278, 314, 205, 206; 215/DIG. 7, DIG. 8; 220/568; 99/348
See application file for complete search history.

(56) References Cited

U.S. PATENT DOCUMENTS

| | | | |
|---|---|---|---|
| 4,380,399 A | 4/1983 | Godat et al. | |
| 4,407,584 A | 10/1983 | Boudin et al. | |
| 4,435,084 A * | 3/1984 | Calhoun et al. | 366/130 |
| 4,528,824 A | 7/1985 | Herbert | |
| 4,702,611 A | 10/1987 | Crossley | |
| 4,887,909 A * | 12/1989 | Bennett | 366/199 |
| 4,967,939 A * | 11/1990 | Taylor | 222/196 |
| 5,148,688 A | 9/1992 | Pimm et al. | |
| 5,283,420 A | 2/1994 | Montalto | |
| 5,360,176 A * | 11/1994 | Mugge et al. | 241/282.1 |
| 5,425,579 A * | 6/1995 | Sampson | 366/130 |
| 5,639,161 A * | 6/1997 | Sirianni | 366/314 |
| 5,720,552 A * | 2/1998 | Schindlegger | 366/197 |
| 5,911,504 A * | 6/1999 | Schindlegger, Jr. | 366/197 |
| 5,969,278 A | 10/1999 | Tsai | |
| 6,390,665 B1 * | 5/2002 | Silveria | 366/307 |
| 6,443,589 B1 | 9/2002 | Lee | |
| 6,471,085 B1 * | 10/2002 | Gallo | 220/501 |
| 6,471,390 B1 * | 10/2002 | Cuthbertson et al. | 366/101 |
| 6,527,433 B2 | 3/2003 | Daniels, Jr. | |
| 6,719,451 B1 * | 4/2004 | Yue | 366/130 |
| 6,736,538 B2 | 5/2004 | Bittner | |
| 6,871,995 B2 | 3/2005 | Simba | |
| 2001/0036124 A1 * | 11/2001 | Rubenstein | 366/205 |
| 2005/0135186 A1 * | 6/2005 | Mbakop | 366/101 |
| 2005/0254341 A1 * | 11/2005 | Gerling et al. | 366/205 |
| 2006/0126431 A1 * | 6/2006 | Bhavnani et al. | 366/314 |
| 2006/0198241 A1 * | 9/2006 | Krishnachaitanya et al. | 366/205 |
| 2007/0056447 A1 * | 3/2007 | Swartz et al. | 366/130 |

\* cited by examiner

*Primary Examiner*—Charles E. Cooley
(74) *Attorney, Agent, or Firm*—Michael A. Myers (57) ABSTRACT

A drinking vessel with a thumb operated electric mixer has a top lip and a bottom. The vessel is sized so that it is capable of handling with one hand in the same fashion as a beverage glass or cup. The vessel may include a handle member that extends beneath the bottom of the beverage container at least a distance equal to the outer diameter of the container. The handle member includes an outwardly extending handle that has a push button switch electrically connected to a power source and motor for driving a mixing propeller located in the container. A liquid-tight compartment at the bottom of the vessel houses the power source and motor. The beverage container and propeller are removable as a single unit from the handle member and liquid-tight compartment so that they may be thoroughly cleaned and the integrity of the electrical parts maintained.

5 Claims, 7 Drawing Sheets

DRINKING VESSEL WITH MIXER

TECHNICAL FIELD OF THE INVENTION

This invention relates generally to drinking vessels and, more particularly, to a drinking vessel with a built-in mixer.

BACKGROUND OF THE INVENTION

Many beverages and foods contained in drinking vessels or cups include undissolved or insoluble constituents. Coffee, tea, chocolate drinks and soup wherein powdered cream, sugar, honey or other condiments are added serve as examples. A spoon or a plastic stirring stick is often necessary to mix the beverage and any condiment before drinking. Remixing is common as time passes and the undissolved or insoluble constituents settle on the bottom of the vessel. If a spoon or mixing stick is not available, users will often shake or "swirl" the vessel to help mix the contents. Obviously, this can result in unwanted spills.

Stirring with a spoon or stick requires use of the other hand that is not handling the cup. This can be undesirable where one may wish to hold other food items or perform other tasks with the free hand. Another problem with previous cups and containers with built-in stirrers is cleaning. It is difficult to thoroughly clean the beverage container or vessel without ruining the electric motor and power source that may be incorporated into the design of such articles. It is therefore desirable that such containers be dishwasher safe wherein the drinking vessel may be detached as a single unit relative to the article's motor, batteries, and other electrical components.

Accordingly, there is a need for a drinking vessel with a built-in mixer that is operable with one hand, that can be handled in the same fashion as a beverage glass or cup, and that can be repeatedly and conveniently washed without wetting the electrical components of the mixer.

SUMMARY OF THE INVENTION

The present invention relates to a drinking vessel with a mixer. The vessel may include a top lip, a bottom and a liquid tight compartment beneath the bottom. The vessel may include a handle secured to its exterior surface. The vessel may be formed from plastic. The vessel may be insulated. The vessel may be suitably sized so that a user can handle the vessel with one hand in the same fashion as a beverage glass or cup.

The liquid tight compartment may be suitable for containing a motor and a power source. The power source is electrically connected to the motor with wires. The motor may have a drivable shaft that extends upwardly through a liquid tight bore formed in the bottom of the vessel. A propeller may be mounted for rotation to the end of the shaft, and a switch means may be electrically connected to the power source for turning the motor on and off.

The switch means may be attached to the exterior of the vessel.

The power source may be a pair of 1.5 v batteries.

The switch means may be a depressible button suitably positioned on and secured to the handle for depressing with a human thumb.

The handle may include a wireway suitable for housing wires that electrically connect the switch means and the motor.

In another aspect of the invention, the vessel may include a handle member that includes a handle. The handle member may extend beneath the bottom of the vessel at least a distance equal to the outer diameter of the vessel. There may be a wireway formed in the interior of the handle member. A motor mount suitable for supporting the motor may also be formed in the handle member. A liquid tight compartment that includes an upstanding wall may be removably secured beneath the handle member. The compartment may be suitably sized for containing a motor, a power source and wires for electrically connecting the power source and the motor. A propeller may be positioned in the vessel and include a downwardly extending shaft that passes through a liquid tight bore formed in the bottom of the vessel. The shaft may include a terminal end suitable for engagement with the motor so that the motor can rotatably drive the shaft. A switch means may be attached to the exterior of the handle and electrically connected to the power source for turning the motor on, and for turning the motor off.

One object of the present invention is to provide an improved drinking vessel with a built-in mixer that is operable with one hand, that can be handled in the same fashion as a beverage glass or cup, and that can be conveniently washed without wetting any of its electrical components. Related objects and advantages of the present invention will be apparent from the following description.

DESCRIPTION OF THE PREFERRED EMBODIMENT

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

With reference to FIGS. 1-4, an embodiment of a drinking vessel 10 with a built-in mixer is illustrated. The vessel includes a beverage container 11 having a top lip 12 and a bottom 14. In a preferred embodiment, the beverage container is insulated using means known in the art. In a more preferred embodiment, the beverage container is a double-walled container having an air space 15 for providing insulation to the container 11. The drinking vessel 10 also includes a liquid tight compartment 30 having an upstanding wall 32 secured beneath the bottom 14 of the vessel by threads 17, which enable access to the compartment 30 for accessing and replacing the power source once exhausted. The compartment 30 and vessel 10 are suitably sized so that a user can handle the vessel 10 in the same fashion as a beverage glass or cup using a single hand.

The liquid-tight compartment 30 houses a motor 40 and a power source 50, which is electrically connected to the motor 40 by wires 77. Wires 77 travel between and electrically connect the button 60 and the power source 50 via wire way 75.

Figure 3:
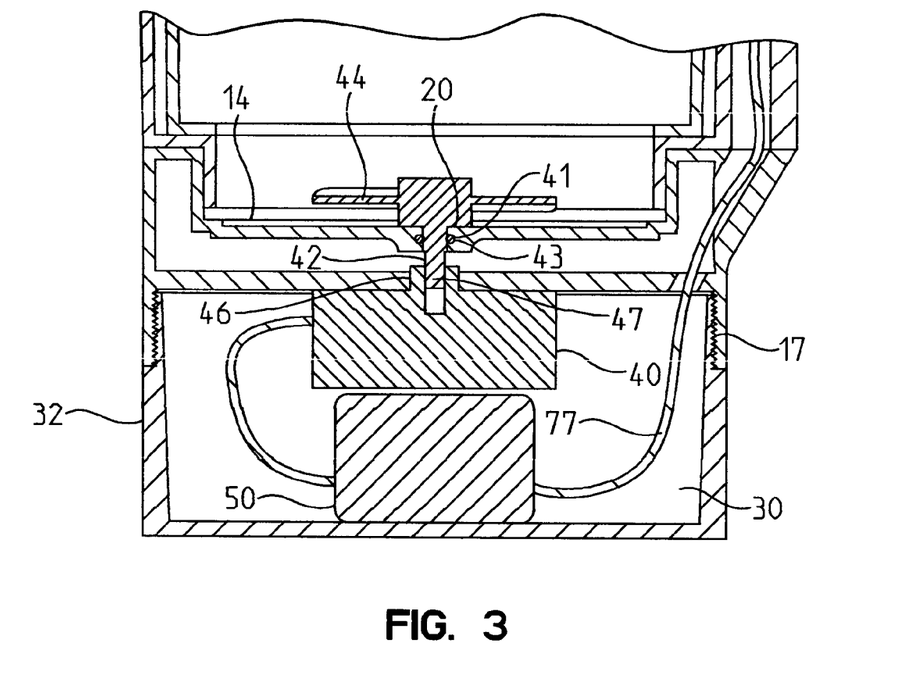
FIG. 3 is an enlarged view of the liquid-tight compartment, power source, motor, shaft, and propeller of the invention shown in FIG. 2.
Figure 4:
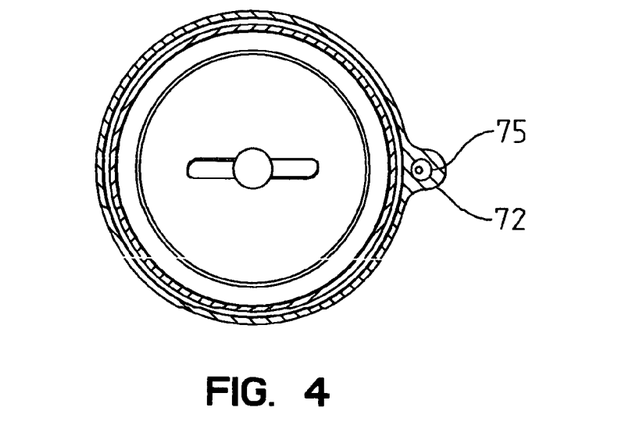
FIG. 4 is a cross sectional view of the embodiment of the invention shown in FIG. 1 taken along lines 4-4.

The motor 40 includes a drivable shaft 42 that extends upwardly through a liquid tight bore 20 formed in the bottom 14 of the beverage container 11. In that embodiment, silicone sealant or the like around and/or within bore 20 may be used to ensure that liquid inside the container 11 does not leak into the compartment 30. In a preferred embodiment, an o-ring groove 41 retains an o-ring 43 for sealing the bore 20 and thus, preventing liquid from leaking into the compartment 30, as shown in FIG. 3. A propeller 44 is mounted for rotation to the end of the shaft 42. A switch means is attached to the exterior of the vessel 10 and electrically connected to the power source 50 for turning the motor 40 on and off. In the preferred embodiment, switch means includes a depressible button 60 secured to the handle 72 and suitably positioned on the handle for depressing with a human thumb as the user singly handles the vessel 10.

Figure 8:
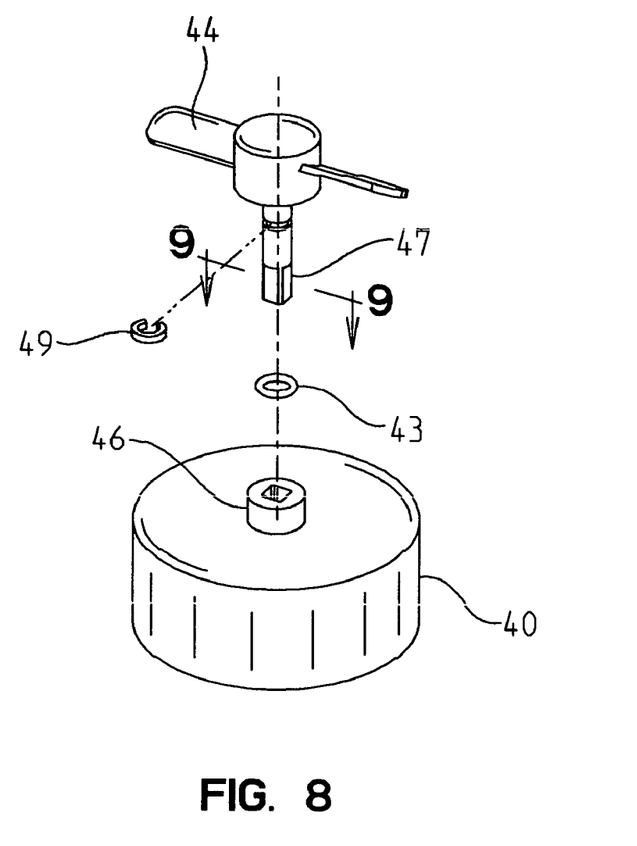
FIG. 8 is an exploded view showing the motor, the motor drive, the shaft, and the propeller of an embodiment of the invention.
Figure 9A:
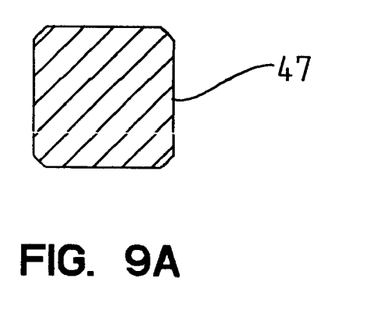
FIG. 9A is a cross section of an embodiment of the shaft end of the propeller shaft of the invention.
Figure 9B:
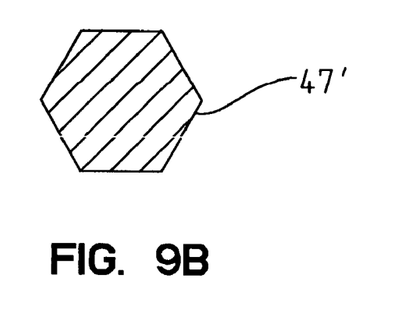
FIG. 9B is a cross section of another embodiment of the shaft end of the propeller shaft of the invention.

The power source is a battery suitable for providing power to the motor 40. In the preferred embodiment, a pair of 1.5 v batteries serves as the power source 50. The drive end of the shaft 47 has a cross-section shaped in a manner so that it is complementary to the shape of and capable of being rotated by the motor drive 46, as shown in FIGS. 8, 9A and 9B. In a preferred embodiment, the cross-section of the drive end of the shaft 47 and the motor drive 46 are in the form of a square. With reference to FIGS. 9A and 9B, in a more preferred embodiment, the cross-section of the drive end of the shaft 47 and the motor drive 46 are in the form of a hexagon.

The drive end of the shaft 47 seats within the motor drive 46 and is secured therein when the user screws the upstanding wall 32 of the compartment 30 onto the downwardly extending wall 16 of the container 11. The propeller 44 is made to turn and the contents of the container 11 are mixed with one hand when the user depresses the button 60. Depressing button 60, again with one hand, turns off the motor 40 and the propeller 44. Hence, the user's free hand is free to hold other food items or perform other tasks.

Figure 1:
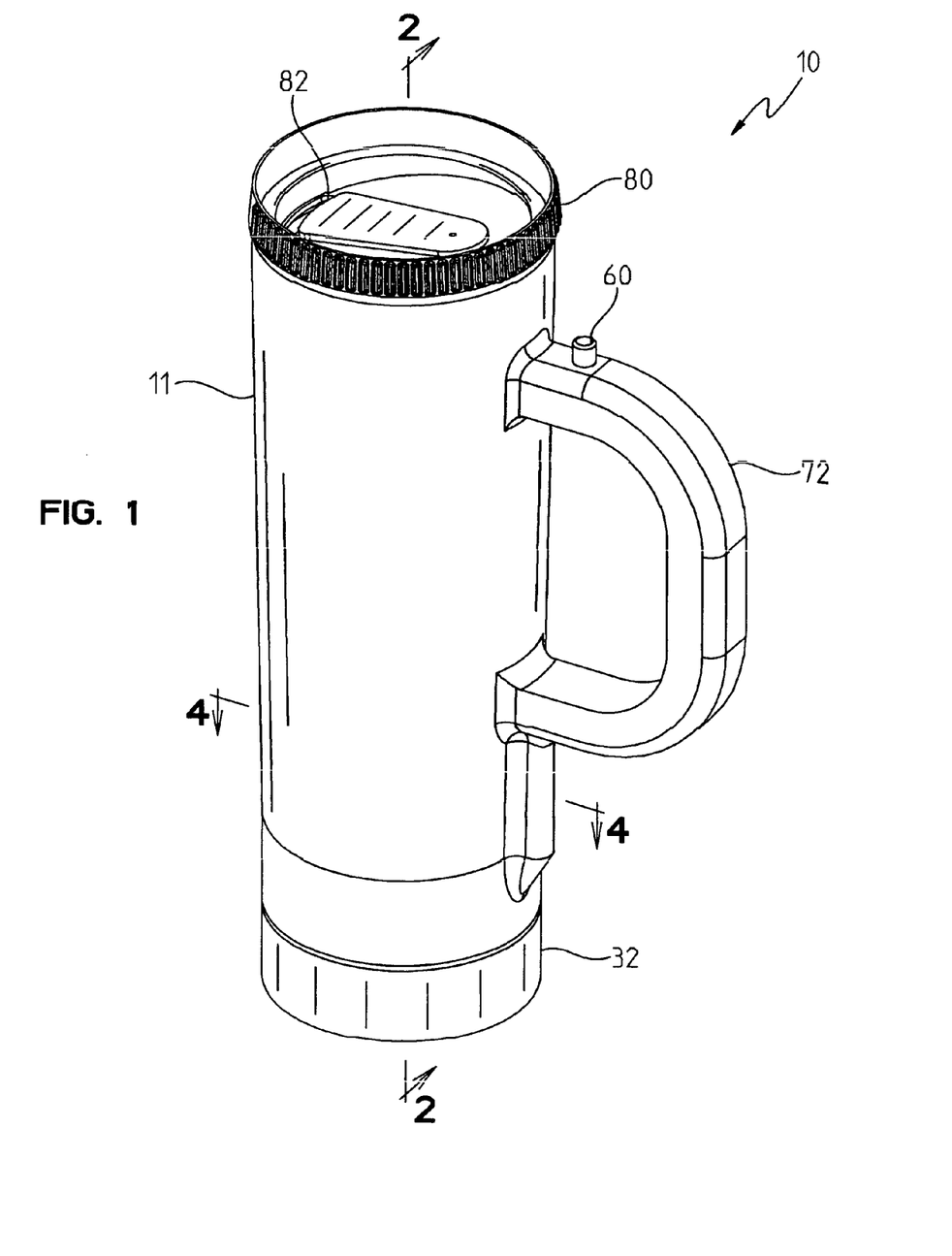
FIG. 1 is a perspective view showing an embodiment of the present invention.
Figure 2:
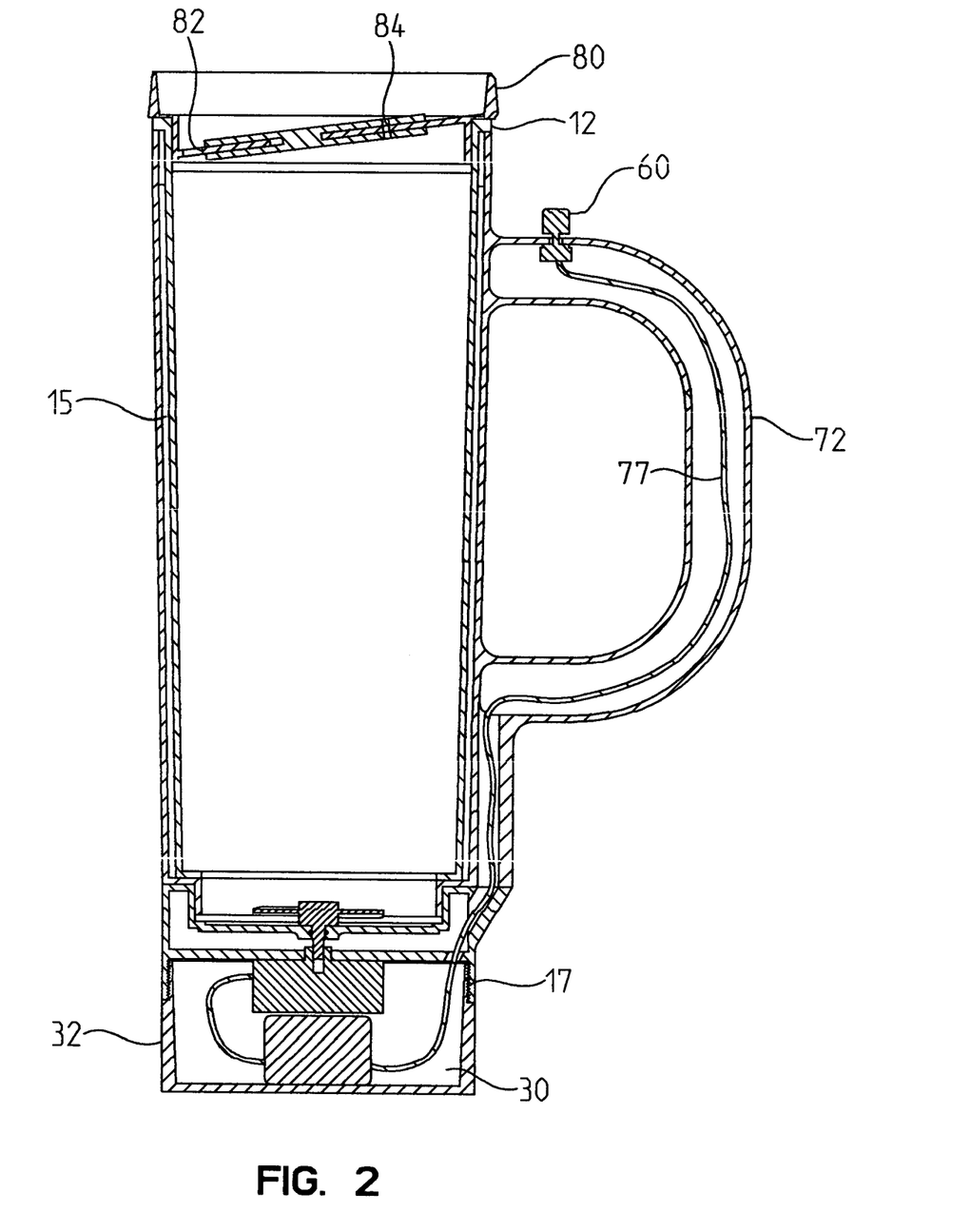
FIG. 2 is a cross sectional side view of the embodiment of the invention shown in FIG. 1 taken along lines 2-2.

In the preferred embodiment, the vessel includes a spillproof top cover 80 having a drinking port 82 and an air port 84 formed therein, as shown in FIGS. 1 and 2. The cover 80 is sized to fit within the open top end of the beverage container 11. In an embodiment, at least the container 11, the top cover 80 and the handle 72 are formed from plastic. In another embodiment, at least the container 11, the handle member 70 and the wall of the compartment 32 are formed from metal. In the most preferred embodiment, the container 11, the handle member and handle 70, 72, the cover 80, and the wall of the compartment 32 are all formed from plastic, and the container 11 includes a double-walled structure defining an air space 15 for insulating the contents of the container 11.

Figure 5:
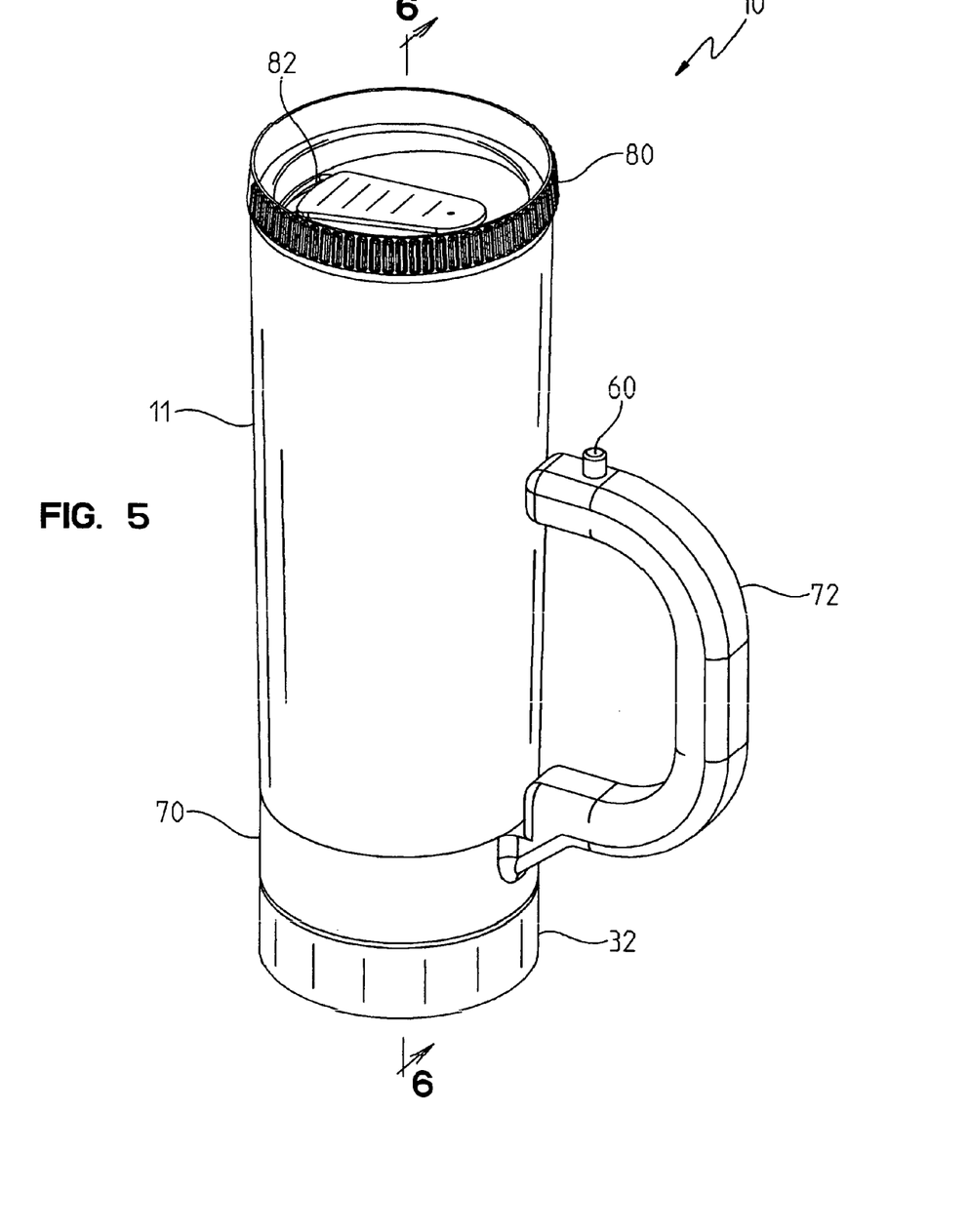
FIG. 5 is a perspective view showing another embodiment of the present invention.
Figure 6:
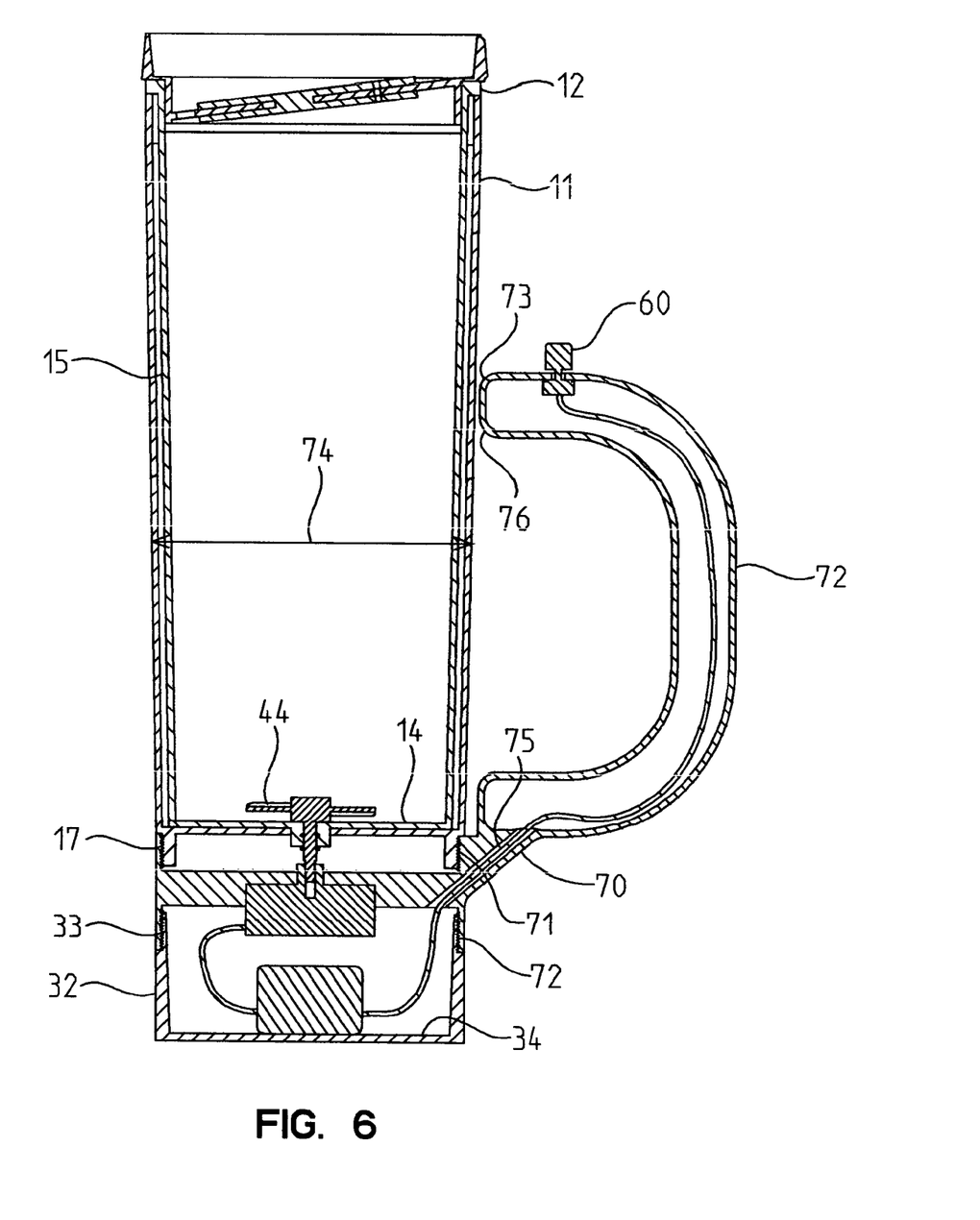
FIG. 6 is a cross sectional side view of the embodiment of the invention shown in FIG. 5 taken along lines 6-6.
Figure 7:
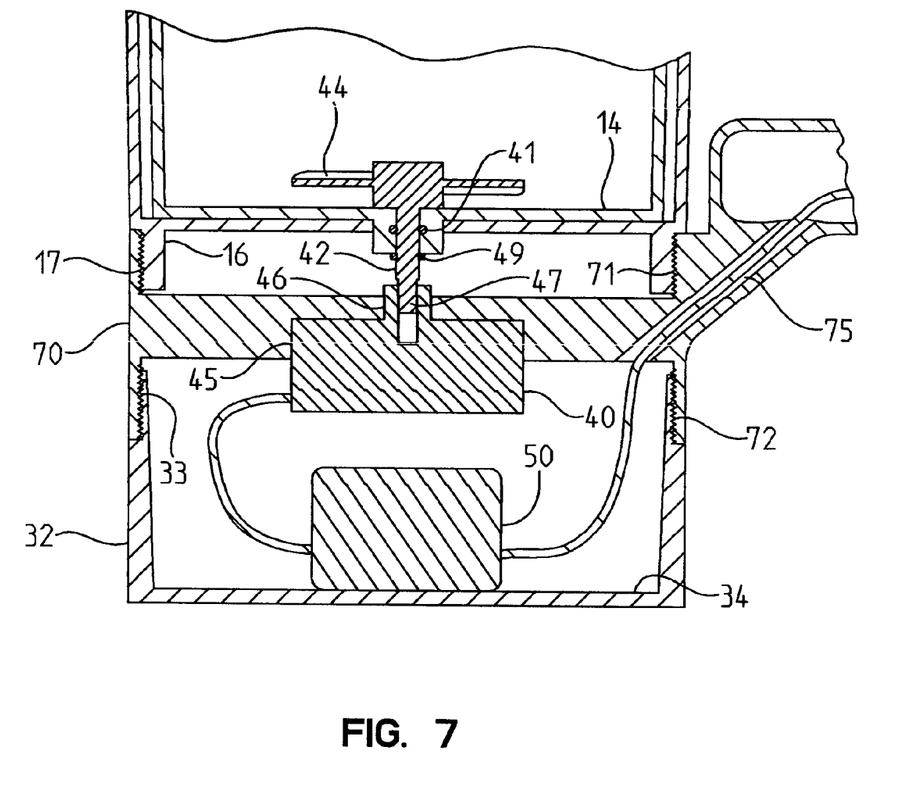
FIG. 7 is an enlarged view of the handle member, the liquid-tight compartment, the power source, the motor, the shaft, and the propeller of the embodiment of the invention shown in FIG. 6.

Referring also to FIGS. 5, 6, and 7, another embodiment of a drinking vessel 10 with a built-in mixer is illustrated. In that embodiment, the vessel 10 includes a beverage container 11 having a top lip 12 and a bottom 14. The vessel 10 includes a handle member 70 that extends beneath the bottom of the container 11 at least a distance equal to the outer diameter 74 of the container 11. The handle 72 is integrally formed with the handle member 70 and extends outwardly from the bottom 14 of the container 11 and is shaped in the form of a handle terminating at its end 73 and thus, defining a space 76 between the exterior surface of the container 11 and the end 73 of the handle 72. In that embodiment, a wire way 75 is formed in the interior of the handle member 70 to house the wires 77 electrically connecting the depressible button switch 60 and the power source 50.

In that embodiment, the motor 40 is mounted to the handle member 70 using means known by skilled artisans such as screws, clips, clamps or the like so that the motor drive 46 is oriented upwardly to receive the drive end 47 of the shaft 42 so that the motor 40 can rotatably drive the shaft 42 and propeller 44. The shaft 42 is coupled to the beverage container 11 by known means, such as a clip 49. In a more preferred embodiment, the motor 40 is received by an indention 45 in the handle member 70 into which the motor 40 snap fits. In the most preferred embodiment, the motor 40 is integrally formed with the handle member 70.

The drive end of the shaft 47 has a cross-section shaped in a manner so that it is complementary to the shape of and capable of being rotated by the motor drive 46, as shown in FIG. 8. Polygonal shapes found effective by the inventor include the square 47 and hexagon 47', as shown in FIGS. 9A and 9B. It should be understood that the invention contemplates any known means that may be used for seating the drive end of the shaft 47 within the motor drive 46 so that the motor 40 can rotate the shaft 42 when the motor 40 is switched on by the button 60.

In the embodiment of FIGS. 5, 6, and 7, the container 11 includes a downwardly extending wall 16 with threads 17, and the handle member 70 includes upper threads 71 so that the container 11, the propeller 44, and the shaft 42 are removable as a single unit from the handle member 70 and compartment 30 so that the container, propeller, and shaft 11, 44, 42 may be thoroughly cleaned, in a dishwashing machine or otherwise, and the electrical parts inside the compartment 30 do not become wet or damaged. The upstanding wall 32 of the liquid-tight compartment 30 also includes threads 33, and the handle member 70 has lower threads 72 allowing access to the compartment 30 for changing batteries.

While the invention has been illustrated and described in detail in the drawings and foregoing description, the same is to be considered illustrative and not restrictive in character. It is understood that the embodiments have been shown and described in the foregoing specification in satisfaction of the best mode and enablement requirements. It is understood that one of ordinary skill in the art could readily make a nearly infinite number of insubstantial changes and modifications to the above-described embodiments and that it would be impractical to attempt to describe all such embodiment variations in the present specification. Accordingly, it is understood that all changes and modifications that come within the spirit of the invention are desired to be protected.

What is claimed is:

1. A drinking vessel with a mixer comprising:
   a vessel having a beverage container with a top lip and a bottom;
   a handle member including a handle, said handle member extending beneath said bottom of the container at least a distance equal to the outer diameter of said container;
   a wireway formed in the interior of the handle member;
   a motor mount formed in said handle member suitable for supporting said motor;
   a liquid tight compartment having an upstanding wall beneath said handle member, said compartment is suitably sized for containing a motor, a power source and wires for electrically connecting the power source and the motor;
   a propeller positioned in the container having a downwardly extending shaft that passes through a liquid tight bore formed in the bottom of the container, said shaft having a terminal end suitable for engagement with the motor so that the motor can rotatably drive the shaft;
   switch means attached to the exterior of the handle and electrically connected to the power source for turning the motor on, and for turning the motor off; and
   said bottom of the beverage container includes a downwardly extending wall with threads, and the handle member includes upper threads so that the beverage container, the propeller and the shaft are removable as a single unit from the handle member and the liquid tight compartment.

2. The drinking vessel according to claim 1, wherein the upstanding wall of the liquid tight compartment includes threads, and the handle member includes lower threads so that the liquid tight compartment is removably securable to the handle member.

3. The drinking vessel according to claim 2, wherein the beverage container is insulated.

4. The drinking vessel according to claim 3, wherein the container, the top cover and the handle are formed from plastic.

5. The drinking vessel according to claim 4, wherein the container, the handle member and the walls of the compartment are formed from metal.

* * * * *